March 18, 1969     H. RÜHLE ET AL     3,433,141
DIRECT-VIEWFINDER
Filed Feb. 2, 1965
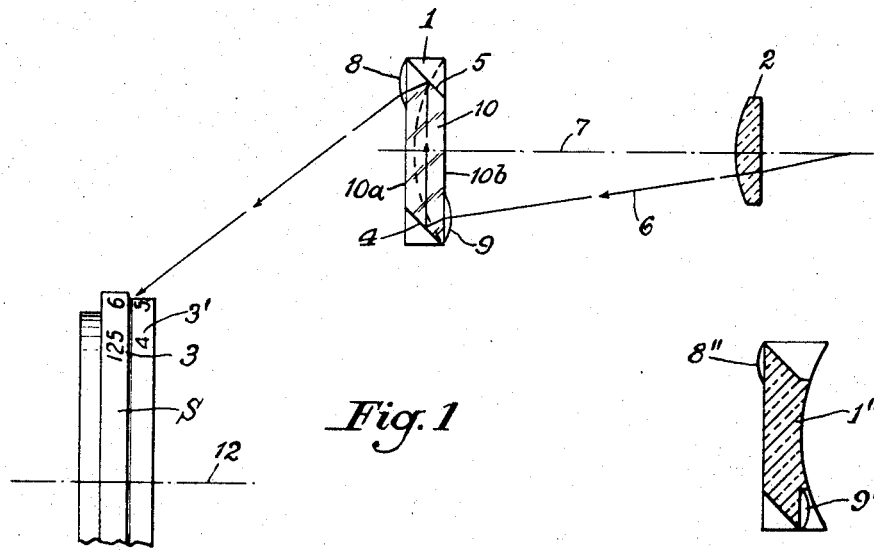
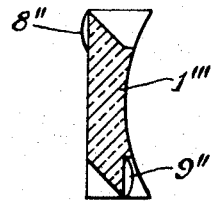
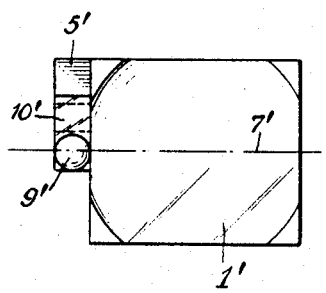 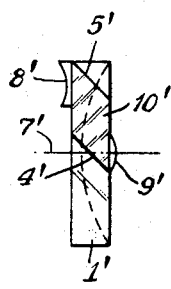 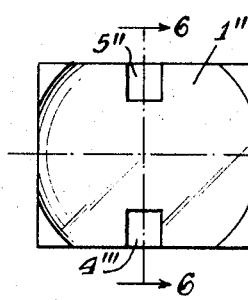 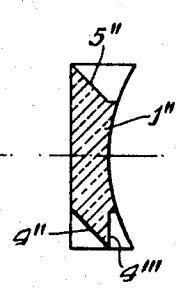
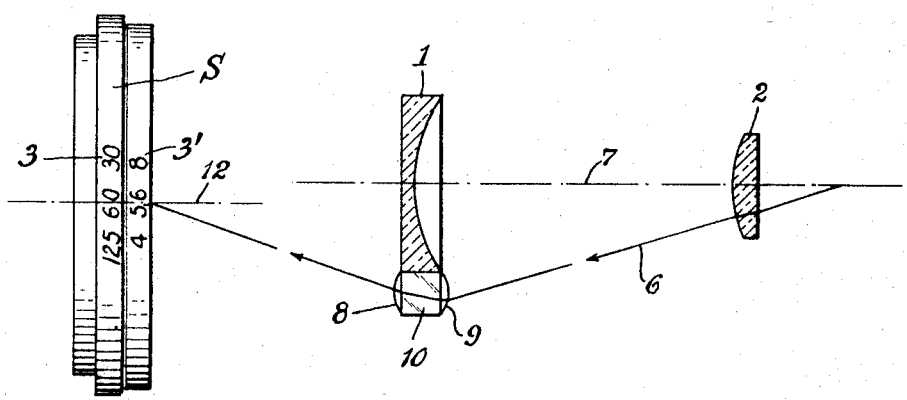

United States Patent Office 3,433,141
Patented Mar. 18, 1969

3,433,141
DIRECT-VIEWFINDER
Hans Rühle, Stuttgart, and Helmut Ebertz, Stuttgart-Mohringen, Germany, assignors to Zeiss Ikon Aktiengesellschaft, Stuttgart, Germany
Filed Feb. 2, 1965, Ser. No. 429,827
Claims priority, application Germany, Feb. 22, 1964,
F 10,667/64
U.S. Cl. 95—11                   4 Claims
Int. Cl. G03b 13/06, 13/02, 13/04

ABSTRACT OF THE DISCLOSURE

A direct-viewfinder for photographic cameras in which the finder objective lens is associated with two vertically spaced reflecting surfaces, either arranged on a vertical prism bar or cut directly into the objective lens body, for permitting the viewing of the adjusting scales which extend at least partially concentrically around the optical axis of the camera objective.

---

The invention relates to a direct-viewfinder for photographic cameras whose scales are arranged at least partly around the photographic objective or the central shutter, respectively, and whose scales by using light deflecting means are at least partly visible in the viewfinder. Such direct-viewfinders may be frame finders, Newton- or Galilei finders.

The visibility of the scales, when looking into the finder, is the better the more directly the scale ring extending around the optical axis of the photographic objective is viewed. To accomplish this, the scale ring may be so designed that its circumferential surface is sufficiently bevelled with respect to the optical axis of the camera objective. This, however, impairs the readability of the scale when one does not look through the viewfinder, because then the scale is mostly viewed directly from above, i.e. the viewing direction is perpendicular to the optical axis of the photographic objective. Another possibility to improve the visibility of the scale when looking through the viewfinder consists in deflecting the marginal rays of the viewfinder by a prism in such a manner that these rays impinge upon the scale at an angle which deviates very little from a right angle. Due to the structural design of the sacle carrying members, the marginal ray associated with the lower portions of the viewfinder image can be deflected only by a few degrees because of the position of the scale with respect to the viwefinder axis, while the upper marginal rays when sufficiently deflected would strike the scale at a sufficiently large angle. However, the deflection of such a light beam is limited by the fact that with a greater prism effect astigmaticism and color defects would occur.

It is the object of the invention to overcome the aforementioned disadvantages by providing two reflecting faces in the viewfinder or in its immediate vicinity between which the scale observing beam extends approximately vertical to the viewfinder axis. The reflecting face adjacent the optical axis of the camera is arranged inclined to the viewfinder ocular and the reflecting face arranged at a distance from the optical axis of the camera is inclined to the scale to be reflected.

As a carrier for these two reflecting faces is preferably used a prism bar which may be arranged in a vertical position in the vicinity of one of the vertical side walls of the viewfinder lens.

In order to give the direction of viewing the scale a large angle, one of the reflecting faces is positioned in the region of the upper viewfinder edge, while the other reflecting face is positioned either in the region of the lower viewfinder boundary edge or, for instance, laterally of the viewfinder lens at the level of the finder axis depending on whether the scale image is to appear in the neighborhood of the lower boundary edge or at the level of the finder axis. If the reflecting faces are disposed in the upper or the lower region of the finder lens, both reflecting faces may be arranged along the vertical side edges of the viewfinder so that the direction of viewing the scale is as steep as possible, while on the other hand the scale is visible during focusing in the region of the lower boundary so that the finder image is not impaired by the scale image. Preferably, as a carrier of the two reflecting faces is used a prismatic body which may be combined with the finder objective lens when a Galilei or a Newton finder is used. In such cases it may be advisable to make the finder objective lens and the prismatic carrier of a plastic or synthetic resin.

A further simplification is obtained by cutting or grinding the reflecting faces into the body of the finder objective lens in such a manner that they are positioned in a center plane which extends vertically through the axis of the viewfinder lens. This dispenses with a separate prismatic carrier for the two reflecting faces.

It is known that the scale to be reflected is viewed through a Galilei or Newton finder only then sharply when the image of the scale appears in the focal point of the ocular lens. But the camera dimensions required therefor are not always available. It is therefore a further object of the invention to adapt the two mentioned reflecting faces to a Galilei or a Newton viewfinder for the purpose of projecting the scale into the focal point of the ocular lens in that concave and/or convex lenses are arranged on the carrier of the reflecting faces which lenses cause the light beam to project the scale image in such a manner that it will appear in the focal point of the ocular lens.

An additional telescopic effect can be achieved by a suitable combniation of such concave and convex lenses in that an enlargement of the numbers on the scale or of the entire viewing area is obtained, if that should be desired. An enlarged image of the area viewed widens the reflected scale range without having to enlarge the cross section of the prism bar or the reflecting faces, respectively.

These additional lenses may also be made integral, as the mentioned reflecting faces, with their carriers, for example with the prism bar or with the viewfinder objective lens.

The drawing illustrates several embodiments of the invention.

FIG. 1 illustrates diagrammatically a side elevation view of a viewfinder and scale reading arrangement in accordance with the invention;

FIG. 2 is a diagrammatic top plan view of the viewfinder arrangement shown in FIG. 1;

FIG. 3 illustrates a front elevation view of the finder objective lens and scale reading means of a modified viewfinder arrangement of the invention;

FIG. 4 illustrates a side elevation of the arrangement shown in FIG. 3;

FIG. 5 illustrates in a front elevation view still another modified finder objective lens and scale reading means of the invention;

FIG. 6 illustrates a sectional view of the arrangement along the line 6—6 in FIG. 5, and FIG. 7 illustrates a sectional view of a modified finder objective lens.

Referring to FIGS. 1 and 2, the direct viewfinder is formed by a Gallilei system including a negative objective lens 1 and a positive ocular lens 2. A scale 3 indicating shutter speeds is arranged on an annular member S which concentrically surrounds a not illustrated photographic camera objective whose optical axis is designated with 12. Along one of the sides of the negative objective lens 1 is arranged a vertically disposed prism 10 having the inclined reflecting end faces 4 and 5. The indicated light ray 6 designates the direction of viewing through the viewfinder whose optical axis is designated with 7. When looking through the ocular 2, the light ray 6 strikes the lower reflecting end face 4 of the prism 10 and from there is reflected so as to pass lengthwise in the prism 10 to the upper reflecting end face 5 which reflects the light ray 6 onto the scale 3 on the member S. This construction makes it possible to observe at least the adjusted shutter speed scale value at a place adjacent the lower edge of the viewfinder image and, a shown in FIG. 2, also a portion of a diaphragm aperture scale 3' may be viewed. For an accurate projection of an image of these scale values into the focal plane of the ocular there are provided one or more lenses 8 and 9 at the upper and lower end, respectively, of the vertical faces 10a and 10b of the prism 10. These lenses, depending upon the requirements, are either concave or convex.

The FIGS. 3, 4 and 5, 6 illustrate each a different viewfinder objective lens according to the invention. In the FIGS. 3 and 4 the reflective face 4' on the lower end of the prism 10' is positioned at the level of the viewfinder axis 7' so that the vertical prism 10' carrying the reflective faces 4' and 5' and the lenses 8' and 9' occupies only about one half of the height of the finder objective lens 1'. It will be noted that the prism 10' is arranged on the vertical left hand side of the negative objective lens 1' (FIG. 3).

In the embodiment according to the FIGS. 5 and 6 the reflective faces 4" and 5" are provided on the lower and the upper portion of the negative finder objective lens 1", or more specifically, in the region of a vertical plane passing through the center of the viewfinder. In order that the light ray reflected by the lower reflecting face 4" in the direction of the ocular will not be additionally reflected when it leaves the lens 1", the latter is provided in its lower portion with a recess 4'" opposite the reflecting face 4". The last described embodiment may be additionally modified by incorporating into the finder objective lens 1'" the lenses 8" and 9" as illustrated in FIG. 7.

What we claim is:

1. A direct-viewfinder for photographic cameras whose adjusting scales extend at least partially concentrically around the optical axis of the camera objective, said viewfinder including a finder objective lens and an ocular lens spaced therefrom along an axis which extends parallel to the optical axis of the camera objective, and means for deflecting an image of said adjusting scales into the viewing area of said viewfinder, said means comprising two vertically spaced palne reflecting surfaces arranged above and below respectively of said axis and in the immediate neighborhood of said finder objective lens, said two reflecting surfaces being disposed at such an inclination that a light ray from said adjusting scales, when reaching the upper one of said two reflecting surfaces, will be deflected at right angles with respect to the finder axis toward the lower one of said two reflecting surfaces and from the latter is reflected toward the eye of the viewer, and lens means arranged in front of said upper reflecting surface and in rear of said lower reflecting surface for producing a viewable image of said adjusting scales.

2. A direct-viewfinder for photographic cameras whose adjusting scales extend at least partially concentrically around the optical axis of the camera objective, said viewfinder including a finder objective lens and means for deflecting an image of said adjusting scales into the viewing area of said viewfinder, said means comprising two vertically spaced reflecting surfaces arranged in the upper and lower marginal portion of said finder objective lens, said two reflecting surfaces being disposed at such an inclination that a light ray from said adjusting scales, when reaching the upper one of said two reflecting surfaces, will be deflected at right angles with respect to the finder axis toward the lower one of said two reflecting surfaces and from the latter is reflected toward the eye of the viewer, and lens means arranged in front of said upper reflecting surface and in rear of said lower reflecting surface for producing a viewable image of said adjusting scales.

3. A direct-viewfinder for photographic cameras whose adjusting scales extend at least partially concentrically around the optical axis of the camera objective, said viewfinder including a finder objective lens and means for deflecting an image of said adjusting scales into the viewing area of said viewfinder, said means comprising two vertically spaced reflecting surfaces arranged in the upper and lower marginal portion of said finder objective lens to be intersected by a plane containing the optical axis of said viewfinder, said two reflecting surfaces being disposed at such an inclination that a light ray from said adjusting scales, when reaching the upper one of said two reflecting surfaces, will be deflected at right angles with respect to the finder axis toward the lower one of said two reflecting surfaces and from the latter is reflected toward the eye of the viewer, and lens means arranged in front of said upper reflecting surface and in rear of said lower reflecting surface for producing a viewable image of said adjusting scales.

4. A direct-viewfinder for photographic cameras whose adjusting scales extend at least partially concentrically around the optical axis of the camera objective, said viewfinder including a finder objective lens and means for deflecting an image of said adjusting scales into the viewing area of said viewfinder, said means comprising a vertically disposed prism body arranged adjacent to and substantially in the plane of said fined objective lens and provided with two vertically spaced reflecting surfaces arranged at the upper and lower end of said prism body, said two reflecting surfaces being disposed at such an inclination that a light ray from said adjusting scales, when reaching the upper one of said two reflecting surfaces, will be deflected at right angles with respect to the finder axis toward the lower one of said two reflecting surfaces and from the latter is reflected toward the eye of the viewer, and lens means arranged in front of said upper reflecting surface and in rear of said lower reflecting surface for producing a viewable image of said adjusting scales.

References Cited

UNITED STATES PATENTS 3,006,262 10/1961 MacMillin.
3,094,911 6/1963 Reiche et al.
3,250,196 5/1966 Ort et al.

JEWELL H. PEDERSON, *Primary Examiner.*

O. B. CHEW, *Assistant Examiner.*

U.S. Cl. X.R.

88—1.5; 244—3.19; 343—112